(12) United States Patent
Yamahara et al.

(10) Patent No.: US 10,281,804 B2
(45) Date of Patent: May 7, 2019

(54) IMAGE PROCESSING APPARATUS, IMAGE PROCESSING METHOD, AND PROGRAM

(71) Applicant: KABUSHIKI KAISHA TOSHIBA, Minato-ku (JP)

(72) Inventors: Hiroyuki Yamahara, Mitaka (JP); Ankit Sharma, Kawasaki (JP); Armand Simon Alymamy Girier, Koto (JP); Yeonsoo Yang, Machida (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/621,554

(22) Filed: Jun. 13, 2017

(65) Prior Publication Data

US 2017/0363936 A1    Dec. 21, 2017

(30) Foreign Application Priority Data

Jun. 15, 2016  (JP) .................................. 2016-119301

(51) Int. Cl.
*G06T 15/00*  (2011.01)
*G03B 21/00*  (2006.01)
(Continued)

(52) U.S. Cl.
CPC ......... *G03B 21/001* (2013.01); *G03B 21/145* (2013.01); *G06T 19/003* (2013.01); *H04N 9/3185* (2013.01); *G06T 2200/04* (2013.01)

(58) Field of Classification Search
CPC .. G03B 21/001; G03B 21/145; H04N 9/3185; G06T 2200/04; G06T 19/003
(Continued)

(56) References Cited

U.S. PATENT DOCUMENTS 7,901,384 B2 * 3/2011 Kleyman .......... A61M 5/31595
                                                    604/207
9,554,729 B2 * 1/2017 Soper ................... A61B 1/0008
(Continued)

FOREIGN PATENT DOCUMENTS

JP    2002-245487    8/2002

OTHER PUBLICATIONS

Fedorov A, Beichel R, Kalpathy-Cramer J, Finet J, Fillion-Robin JC, Pujol S, Bauer C, Jennings D, Fennessy F, Sonka M, Buatti J. 3D Slicer as an image computing platform for the Quantitative Imaging Network. Magnetic resonance imaging. Nov. 1, 2012;30(9):1323-41.*

(Continued)

*Primary Examiner* — Phu K Nguyen
(74) *Attorney, Agent, or Firm* — Oblon, McClelland, Maier & Neustadt, L.L.P.

(57) ABSTRACT

An image processing apparatus includes a three-dimensional space information storage unit, a projection unit, an operation acquisition unit, a reference guide rail decision unit, and a motion vector calculation unit. The projection unit projects and draws a cross-sectional plane onto a projection plane on the basis of information on a position of the cross-sectional plane stored by the three-dimensional space information storage unit. The reference guide rail decision unit decides a reference guide rail on the basis of information on a position of a slide operation acquired by the operation acquisition unit. The motion vector calculation unit calculates a two-dimensional motion vector parallel to the reference guide rail on the basis of a direction of the slide operation and an amount of movement, calculates a three-dimensional motion vector corresponding to the two-dimensional motion vector, and changes the position of the cross- (Continued)

sectional plane in accordance with the calculated three-dimensional motion vector.

7 Claims, 6 Drawing Sheets

(51) Int. Cl.
    *G03B 21/14*         (2006.01)
    *G06T 19/00*         (2011.01)
    *H04N 9/31*          (2006.01)

(58) Field of Classification Search
    USPC .......................................................... 345/419
    See application file for complete search history.

(56) References Cited

U.S. PATENT DOCUMENTS

| | | | | |
|---|---|---|---|---|
| 9,639,666 B2* | 5/2017 | Baker | .................... | G16H 40/63 |
| 9,770,216 B2* | 9/2017 | Brown | .................... | A61B 6/032 |
| 9,925,009 B2* | 3/2018 | Baker | .................... | A61B 34/10 |

OTHER PUBLICATIONS

Egger J, Kapur T, Fedorov A, Pieper S, Miller JV, Veeraraghavan H, Freisleben B, Golby AJ, Nimsky C, Kikinis R. GBM volumetry using the 3D Slicer medical image computing platform. Scientific reports. Mar. 4, 2013;3:1364.*

Park JS, Chung MS, Park HS, Shin DS, Har DH, Cho ZH, Kim YB, Han JY, Chi JG. A proposal of new reference system for the standard axial, sagittal, coronal planes of brain based on the serially-sectioned images. Journal of Korean medical science. Jan. 1, 2010;25(1):135-41.*

Documentation/4.5/Announcements—SlicerWiki], [online]Dec. 15, 2015,The community of Slicer developers, retrieval date: Apr. 10, 2016, Internet URL:http://wiki.slicer.org/slicerWiki/index.php/Documentation/4.5/Announcements, 2015, 23 Pages.

Cross-section rendering, [online]Mar. 4, 2012, CGrad Project Blog, retrieval date: Apr. 10, 2016, InternetURL:http://www.cgradproject.com/blog/archives/category/blender/%E6%96%AD%E9%9D%A2%E3%83%AC%E3%83%B3%E3%83%80%E3%83%AA%E3%83%B3%E3%82%B0, 2012, 3 Pages (with Computer Generated English Translation).

* cited by examiner

```
                                                            ~13
┌─────────────────────────────────────────────────────────────┐
│ THREE-DIMENSIONAL SPACE INFORMATION STORAGE UNIT            │
│  ┌────────────────────────────────────────────────────────┐ │
│  │ GUIDE RAIL SETTING INFORMATION                         │ │
│  │   — THE NUMBER OF GUIDE RAILS                          │ │
│  │   — INFORMATION ON POSITION OF GUIDE RAIL WITH         │ │
│  │     RESPECT TO CROSS-SECTIONAL PLANE (FOR THE NUMBER)  │ │
│  │   — LENGTH OF GUIDE RAIL (FOR THE NUMBER)              │ │
│  └────────────────────────────────────────────────────────┘ │
│  ┌────────────────────────────────────────────────────────┐ │
│  │ CROSS-SECTIONAL PLANE INFORMATION                      │ │
│  │   — INCLINATION INFORMATION OF CROSS-SECTIONAL PLANE   │ │
│  │     (EQUATION OR NORMAL VECTOR INFORMATION)            │ │
│  │   — RANGE INFORMATION OF CROSS-SECTIONAL PLANE         │ │
│  └────────────────────────────────────────────────────────┘ │
│  ┌────────────────────────────────────────────────────────┐ │
│  │ GUIDE RAIL INFORMATION                                 │ │
│  │   — START COORDINATES AND END COORDINATES OF EACH GUIDE RAIL │ │
│  └────────────────────────────────────────────────────────┘ │
│  ┌────────────────────────────────────────────────────────┐ │
│  │ VIEWPOINT INFORMATION                                  │ │
│  │   — VIEWPOINT COORDINATES                              │ │
│  └────────────────────────────────────────────────────────┘ │
│  ┌────────────────────────────────────────────────────────┐ │
│  │ PROJECTION PLANE INFORMATION                           │ │
│  │   — INCLINATION INFORMATION OF PROJECTION PLANE        │ │
│  │     (EQUATION OR NORMAL VECTOR INFORMATION)            │ │
│  │   — RANGE INFORMATION OF PROJECTION PLANE              │ │
│  └────────────────────────────────────────────────────────┘ │
└─────────────────────────────────────────────────────────────┘
```

FIG. 5

```
                                                 ~12
┌──────────────────────────────────────────────────┐
│ TWO-DIMENSIONAL AREA INFORMATION STORAGE UNIT    │
│   ┌──────────────────────────────────────────┐   │
│   │ REFERENCE GUIDE RAIL INFORMATION         │   │
│   │   — ID OF SELECTED GUIDE RAIL            │   │
│   └──────────────────────────────────────────┘   │
│   ┌──────────────────────────────────────────┐   │
│   │ REFERENCE DISTANCE                       │   │
│   │   — d  (FOR DECIDING REFERENCE GUIDE RAIL)│  │
│   └──────────────────────────────────────────┘   │
│   ┌──────────────────────────────────────────┐   │
│   │ REFERENCE ANGLE                          │   │
│   │   — θ  (FOR DETERMINING MOVING DIRECTION)│   │
│   └──────────────────────────────────────────┘   │
└──────────────────────────────────────────────────┘
```

IMAGE PROCESSING APPARATUS, IMAGE PROCESSING METHOD, AND PROGRAM

CROSS-REFERENCE TO RELATED APPLICATIONS

This application is based upon and claims the benefit of priority from Japanese Patent Application No. 2016-119301, filed Jun. 15, 2016; the entire contents of which are incorporated herein by reference.

BACKGROUND OF THE INVENTION

Technical Field

Embodiments of the present invention generally relate to an image processing apparatus, an image processing method, and a program.

Related Art

A technology to display a three-dimensional space on a display device such as a computer in fields such as a diagnosis by medical images, three-dimensional modeling, and three-dimensional computer graphics (3D-CG) exists as background art. In this technology, the three-dimensional space is projected onto a predetermined projection plane in three-dimensional space and an image on this projection plane is displayed on a display device. In addition, a cross-sectional plane existing in the three-dimensional space is projected onto the projection plane to be displayed in some cases.

In the related art, there is a function which allows a user to move a cross-sectional plane in a three-dimensional space. At this time, a user moves the cross-sectional plane via a user interface using a pointing means such as a mouse, a pen tab, and a touch panel. However, since there are different viewpoints between an area in which the cross-sectional plane to be moved is displayed and the projection plane of the three-dimensional space, a moving direction intuited by the user may not match an actual moving direction of the cross-sectional plane. In this case, the user cannot perform an intuitive operation and this may cause frustration.

In addition, a function which allows a user to move the cross-sectional plane in the three-dimensional space by changing a displayed parameter numerical value is in the related art. At this time, the parameter numerical value is changed as a result of operating the pointing means to press an arrow button on a screen. However, a moving direction of the arrow for changing the numerical value may not match the moving direction of the cross-sectional plane in some cases. In this case, there is a possibility that a smooth operation cannot performed by the user.

Examples of the above-described related art are disclosed in Japanese Unexamined Patent Application, First Publication No. 2002-245487, "Documentation/4.5/Announcements-SlicerWiki", [online], Dec. 15, 2015 (2015), The community of Slicer developers, [Search on Apr. 10, 2016], Internet URL: http://wiki.slicer.org/slicerWiki/index.php/Documentation/4.5/Announcements, and "Cross Section Rendering", [online], Mar. 4, 2012 (2012), CGrad Project Blog, [Accessed on Apr. 10, 2016], Internet URL: http://www.cgradproject.com/blog/archives/category/blender/%E6%96%AD%E9%9D%A2%E3%83%AC%E3%83%B3%-E3%83%80%E3%83%AA%E3%83%B3%E3%82%B0 are another examples of the related art.

DETAILED DESCRIPTION

Hereinafter, embodiments of an image processing apparatus, an image processing method, and a program will be described with reference to drawings.

First Embodiment

Figure 1:
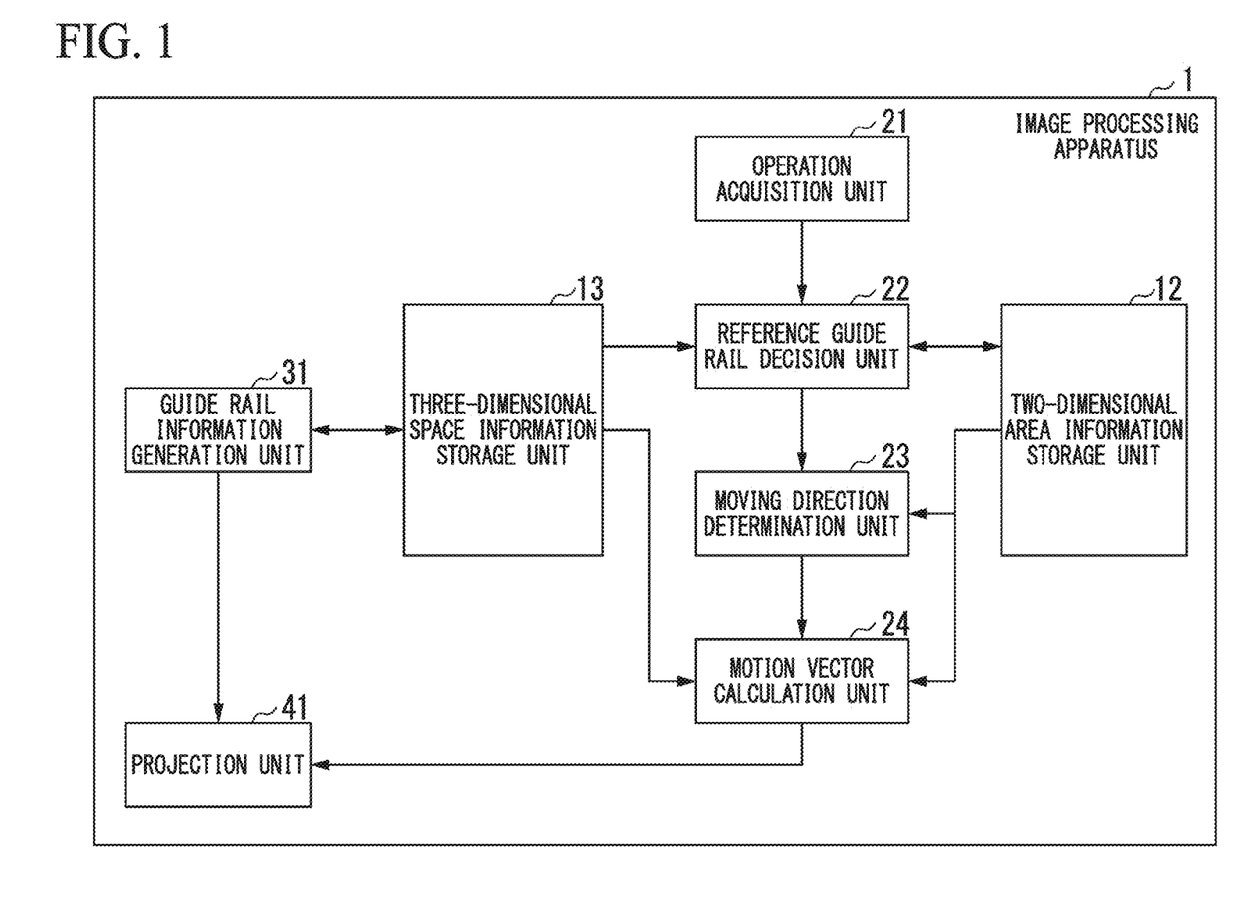
FIG. 1 is a block diagram which shows a schematic functional configuration of an image processing apparatus of a first embodiment.

FIG. 1 is a block diagram which shows a schematic functional configuration of an image processing apparatus of a first embodiment. As illustrated, an image processing apparatus 1 is configured to include a two-dimensional area information storage unit 12, a three-dimensional space information storage unit 13, an operation acquisition unit 21, a reference guide rail decision unit 22, a moving direction determination unit 23, a motion vector calculation unit 24, a guide rail information generation unit 31, and a projection unit 41.

The image processing apparatus 1 models various objects and the like in a virtual three-dimensional space, and displays an image obtained as a result of projecting these objects onto a projection plane on a screen and the like. The image processing apparatus 1 is realized as an information processing apparatus using an electronic circuit. The two-dimensional area information storage unit 12 and the three-dimensional space information storage unit 13 are realized by using an information storage medium such as a semiconductor memory or a magnetic hard disk. The image processing apparatus 1 may be realized by a computer and a program. More specifically, the image processing apparatus 1 can also be realized by devices, such as a personal computer, a tablet terminal device, and a smart phone (a smart phone), and an application program (application) running on a central processing unit (CPU) of these devices.

A user of the image processing apparatus 1 views images displayed on a display device such as a liquid crystal display device. In addition, a user can perform an operation related to the displayed images using a pointing device such as a mouse, a touch panel, or a pen tab. In the following, a space handled as a processing target by the image processing apparatus 1 is called a "three-dimensional space," and a screen of the projection plane or the display device described above is called a "two-dimensional space." A process itself in which the image processing apparatus 1 stores information of objects in the three-dimensional space or renders these objects can be performed using an existing technology.

In addition, the image processing apparatus 1 displays a cross-sectional plane in the three-dimensional space on the display device in a state in which the cross-sectional plane projected onto the projection plane. Then, the image processing apparatus 1 performs a process of moving this cross-sectional plane in the three-dimensional space based on an operation of a user.

Here, the cross-sectional plane is a cross-sectional plane obtained by cutting the three-dimensional space. The image processing apparatus 1 displays images in this cross-sectional plane to present a state of the three-dimensional space to the user. The cross-sectional plane is a plane. When a point in the three-dimensional space is represented by coordinates (X,Y,Z), a state of the point in the three-dimensional space can be represented by a value V(X,Y,Z). A plane in the three-dimensional space is set as P, an image of the cross-sectional plane can be represented by a set of the value V(X,Y,Z) at the point (X,Y,Z) which satisfies (X,Y,Z)∈P. The image processing apparatus 1 provides a user interface for moving such a cross-sectional plane.

When the cross-sectional plane is moved on the basis of an operation of a user, the image processing apparatus 1 moves the cross-sectional plane along a predetermined guide rail. A position of the guide rail and the like are preset as setting information. In the present embodiment, the guide rail is perpendicular to the cross-sectional plane. However, the guide rail and the cross-sectional plane may not be perpendicular to each other. Even when the guide rail and the cross-sectional plane intersect each other to form a predetermined angle other than 90 degrees, it is possible to move the cross-sectional plane along the guide rail. The guide rail may also be called a "guide line."

In a following, functions of each unit configuring the image processing apparatus 1 will be described.

The two-dimensional area information storage unit 12 stores information on a two-dimensional area. Details of the data stored by the two-dimensional area information storage unit 12 will be described below with reference to other drawings.

The three-dimensional space information storage unit 13 stores information on the three-dimensional space. The three-dimensional space information storage unit 13 stores at least information representing a position of a cross-sectional plane in the three-dimensional space.

Details of the data stored by the three-dimensional space information storage unit 13 will be described below with reference to other drawings.

The operation acquisition unit 21, the reference guide rail decision unit 22, the moving direction determination unit 23, and the motion vector calculation unit 24 perform a process such as calculation for moving a cross-sectional plane on the basis of an operation of a user.

The operation acquisition unit 21 acquires content of an operation of a user and parameters of the operation. In particular, the operation acquisition unit 21 acquires a type of operation on a screen by the user and information on a position at which the operation is performed. With respect to a slide operation which is a type of operation, the operation acquisition unit 21 detects a slide operation which slides a point instructed by an instruction means such as a finger or a pointing stick drawn by a projection plane on the screen. Then, the operation acquisition unit 21 acquires information on a position on the screen at which the slide operation is performed. The information on the position of the slide operation is information on coordinates of a start point(s) and coordinates of an end point of the slide operation on the screen.

The reference guide rail decision unit 22 performs the following process on the basis of the information on the position of the slide operation, that is, the coordinates of the start point and the coordinates of the end point, acquired by the operation acquisition unit 21. In other words, the reference guide rail decision unit 22 decides a guide rail which is orthogonal to the cross-sectional plane in the three-dimensional space and projected onto a projection plane near the position of the slide operation when the slide operation is detected as a reference guide rail. The reference guide rail decision unit 22 of the present embodiment refers to the three-dimensional space information storage unit 13 and selects and decides the reference guide rail among guide rails generated by the guide rail information generation unit 31 on the basis of a direction of the slide operation.

The moving direction determination unit 23 determines in which side direction of extending directions of the reference guide rail the cross-sectional plane is moved.

The motion vector calculation unit 24 calculates a two-dimensional motion vector which represents movement on the screen and is parallel to the reference guide rail on the basis of a direction of the slide operation and an amount of movement when the slide operation is performed. Then, the motion vector calculation unit 24 calculates a three-dimensional motion vector representing a direction of movement and an amount of movement in the three-dimensional space corresponding to the two-dimensional motion vector existing on the projection plane. Then, the motion vector calculation unit 24 changes a position of the cross-sectional plane in the three-dimensional space stored by the three-dimensional space information storage unit 13 according to the calculated three-dimensional motion vector.

The position of the cross-sectional plane is rewritten on the three-dimensional space information storage unit 13 so that the cross-sectional plane is re-drawn. Specifically, the motion vector calculation unit 24 passes information on a position of the cross-sectional plane after movement to the projection unit 41. If the information on the position of the cross-sectional plane after movement is received from the motion vector calculation unit 24, the projection unit 41 projects the cross-sectional plane after a movement onto the projection plane. After the movement of the cross-sectional plane, at least a portion corresponding to a position at which the cross-sectional plane existed before the movement and a portion corresponding to a position at which the cross-sectional plane exists after the movement are re-drawn on the projection plane.

The guide rail information generation unit 31 generates information on a guide rail orthogonal to a given cross-sectional plane on the basis of guide rail setting information and writes the guide rail information in the three-dimensional space information storage unit 13. The guide rail setting information will be described below.

In other words, the guide rail information generation unit 31 generates guide rail information, which is information on one or more guide rails, on the basis of the guide rail setting information preset and the information on the position of the cross-sectional plane, and writes the guide rail information in the three-dimensional space information storage unit 13. The guide rail information generated by the guide rail information generation unit 31 is information on a position of each guide rail (coordinates of a start point and an end point). In addition, the guide rail information generation unit 31 causes the projection unit 41 to project a guide rail onto the projection plane by passing the generated guide rail information to the projection unit 41.

The projection unit 41 projects these objects onto the projection plane based on information on objects in the three-dimensional space. An image projected onto the projection plane is displayed on a display device of the image processing apparatus 1 as it is. The objects projected onto the projection plane by the projection unit 41 include the cross-sectional plane of the three-dimensional space and the guide rail. That is, the projection unit 41 projects and draws the cross-sectional plane of the three-dimensional space onto the projection plane based on the information on the position of the cross-sectional plane stored by the three-dimensional space information storage unit 13. The projection unit 41 may perform a perspective projection or a parallel projection. In the case of performing the perspective projection, the projection unit 41 references information on viewpoint coordinates held by the three-dimensional space information storage unit 13.

Figure 2:
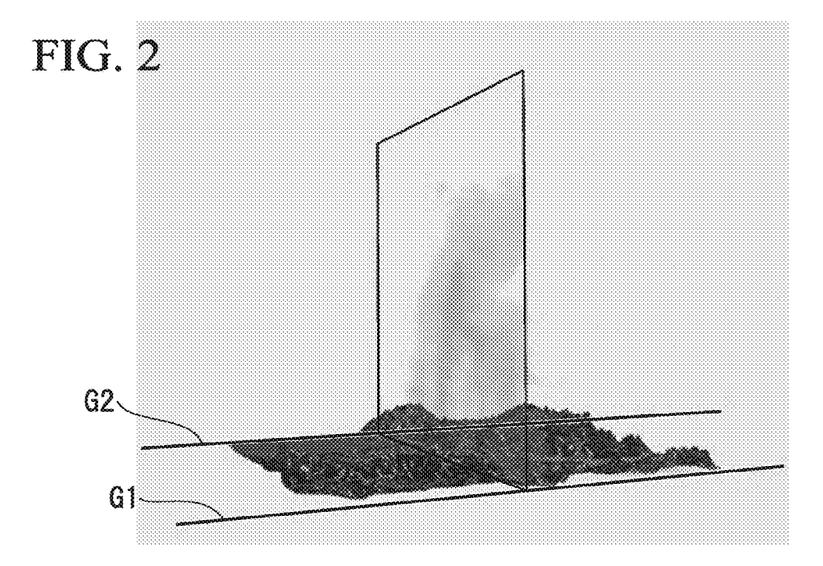
FIG. 2 is a schematic diagram which shows an example of a three-dimensional space projected by the image processing apparatus of the first embodiment.
Figure 3:
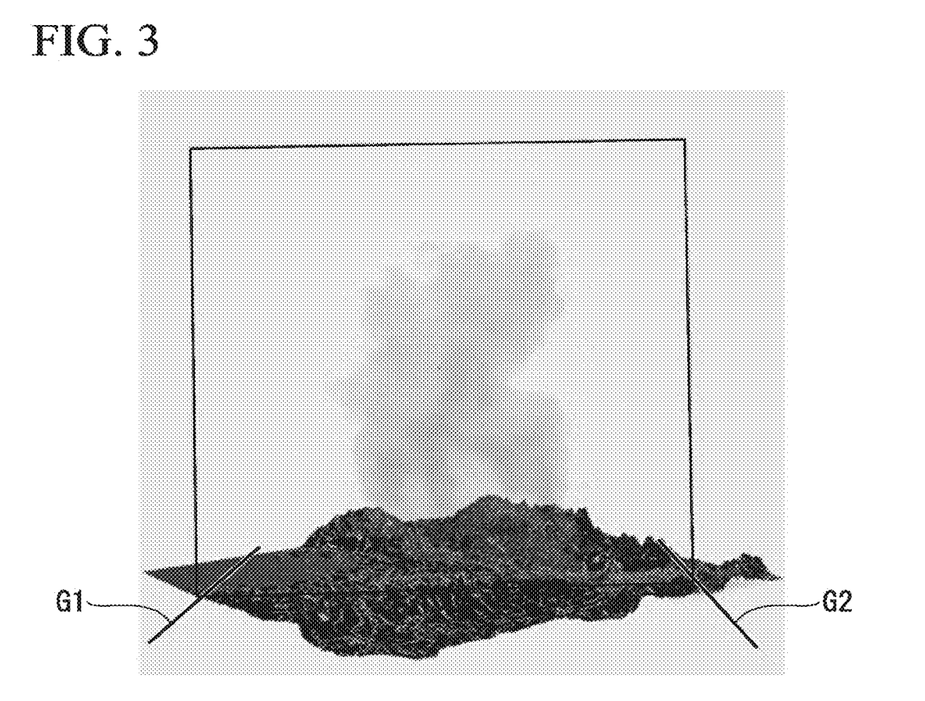
FIG. 3 is a schematic diagram which shows an example of the three-dimensional space projected by the image processing apparatus of the first embodiment.

FIGS. 2 and 3 are schematic diagrams which show a display example of a projected three-dimensional space displayed by the image processing apparatus 1. Images displayed in FIGS. 2 and 3 are images obtained by projecting a three-dimensional space onto a projection plane. In the drawings, a black quadrangular frame is an outer frame of the cross-sectional plane in the three-dimensional space. In addition, each of black portions marked with signs G1 and G2 is a guide rail. Moreover, a terrain in the three-dimensional space is projected onto the projection plane in FIGS. 2 and 3. Gray scale images are drawn on the cross-sectional plane in the three-dimensional space in FIGS. 2 and 3. That is, the image processing apparatus 1 displays an outer frame of the cross-sectional plane which is projected onto the projection plane, the guide rails G1 and G2, the terrain, and the images in the cross-sectional plane. After a reference guide rail is decided by a procedure to be described below, the image processing apparatus 1 may display only the reference guide rail. FIGS. 2 and 3 are examples in which weather data (for example, an amount of moisture in the three-dimensional space and the like) are displayed.

In the weather data which is a basis of FIGS. 2 and 3, numerical data corresponding to coordinates of portions above the ground in the three-dimensional space are included. The numerical data can be converted into a pixel value. The pixel value corresponds to a gray scale gradation in a case of a white black image, and corresponds to a color in a case of a color image.

The image processing apparatus 1 projects and displays a cross-sectional diagram in a cross-sectional plane which has a numerical value corresponding to coordinates of the three-dimensional space onto the projection plane.

The illustrated examples are examples of weather data, but embodiments are not limited to the weather data. It is possible to use this image processing apparatus 1 for graphically displaying numerical data distributed in a three-dimensional space.

For example, it is possible to use this image processing apparatus 1 for shape modeling (automobiles, buildings, precision equipment parts, and the like), medical data display (three-dimensional display of organs and the like by computer tomography (CT) or nuclear magnetic resonance imaging (MRI)), or other uses.

In the illustrated example, the number of guide rails is two, but the number of guide rails is arbitrary depending on settings. Using one or more guide rails is preset. In addition, in the illustrated example, the cross-sectional plane has a quadrangular shape and is represented as a cross-sectional plane using lines of four black frames, but the shape of the cross-sectional plane and the number and the shape of frame lines are arbitrary. In addition, since perspective projection is used in the illustrated example, a plurality of guide rails parallel in the three-dimensional space are not drawn in parallel but intersect at a vanishing point in an image projected onto the projection plane. The vanishing point exists at infinity. Parallel projection is used instead of perspective projection to perform projection onto the projection plane.

Next, a configuration of data used by the image processing apparatus 1 will be described.

Figure 4:
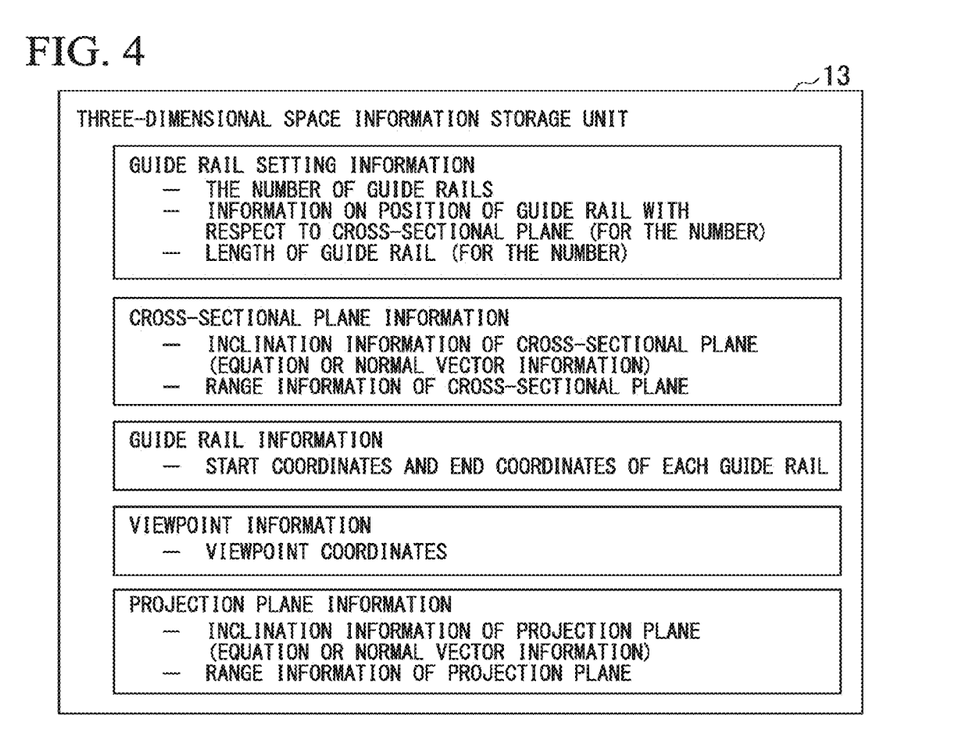
FIG. 4 is a schematic diagram which shows a configuration example of data stored by a three-dimensional space information storage unit of the first embodiment.

FIG. 4 is a schematic diagram which shows a configuration example of data stored by the three-dimensional space information storage unit 13 of the first embodiment. As shown in FIG. 4, the three-dimensional space information storage unit 13 stores guide rail setting information, cross-sectional plane information, guide rail information, viewpoint information, and projection plane information.

The guide rail setting information is preset information for generating a guide rail. The guide rail setting information includes numerical information indicating the number of guide rails, information on a position of a guide rail with respect to a cross-sectional plane (information on a position of each individual guide rail), and information on a length of the guide rail (information on a length of each individual guide rail). A position or an orientation of the cross-sectional plane can be changed, but the information on the position of the guide rail with respect to the position of the cross-sectional plane can be represented as information on a relative relationship with respect to the cross-sectional plane such as a lower left end of the cross-sectional plane (a left side viewed in a predetermined direction) or a lower right end of the cross-sectional plane, for example. The information on the length of the guide rail is represented as numerical information of a length in a coordinate system of the three-dimensional space.

The guide rail setting information is referenced to when the guide rail information generation unit 31 generates the guide rail information.

The cross-sectional plane information includes inclination information of the cross-sectional plane and information on a range of the cross-sectional plane. The inclination information of the cross-sectional plane is represented as information of a plane equation in a three-dimensional space coordinate system (for example, xyz orthogonal coordinates). Alternatively, the inclination information of the cross-sectional plane is represented as information on a component of a normal vector of the cross-sectional plane. When the cross-sectional plane has a range (for example, the cross-sectional plane is a view of an inside range of a quadrangle surrounded by four sides), the information on the range of the cross-sectional plane represents the range. For example, the information on the range of the cross-sectional plane is represented as information on an equation of a boundary line which separates the inside of the cross-sectional plane from the outside.

The guide rail information is information generated by the guide rail information generation unit 31. The guide rail information is information on coordinates of a start point and an end point of each of the generated guide rails in the three-dimensional space. In addition, each of the guide rails is identified by information on a guide rail ID.

The viewpoint information is information representing a position of a viewpoint when the three-dimensional space is projected onto the projection plane. The viewpoint information is a coordinate value of the viewpoint in the three-dimensional image.

The projection plane information includes inclination information of the projection plane and information on a range of the projection plane. The inclination information of the projection plane is represented as information of an equation representing a plane of the projection plane as coordinates of the three-dimensional space. Alternatively, the inclination information of the projection plane is represented as information on a component of a normal vector of the projection plane. The information on the range of the projection plane is information representing the range of the projection plane (a range displayed on a display device and the like) using coordinates of the three-dimensional space. As an example, the information on the range of the projection plane is represented as information on an equation of a boundary line which separates the inside of the projection plane from the outside.

Figure 5:
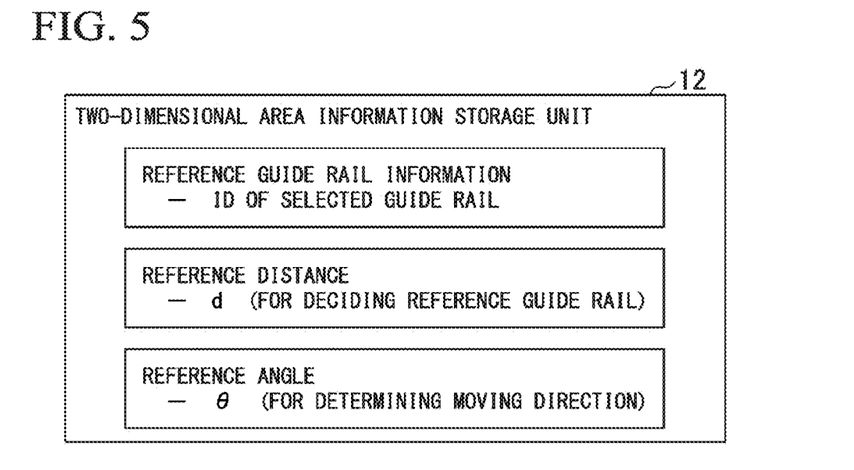
FIG. 5 is a schematic diagram which shows a configuration example of data stored by a two-dimensional area information storage unit of the first embodiment.

FIG. 5 is a schematic diagram which shows a configuration example of data stored by the two-dimensional area information storage unit 12. As shown in FIG. 5, the two-dimensional area information storage unit 12 stores reference guide rail information, a reference distance, and a reference angle.

The reference guide rail information is information on an ID of a reference guide rail among a plurality of guide rail IDs. The reference guide rail is decided by the reference guide rail decision unit 22.

The reference guide rail decision unit 22 writes an ID of a selected reference guide rail as the reference guide rail information.

The reference distance is numerical information representing a distance d used when the reference guide rail is decided. The distance d is a distance in a coordinate system of a two-dimensional area. The reference distance d is an upper limit of a distance between a touch position when a slide operation is performed and a guide rail which can be selected as the reference guide rail. A specific value of d may be appropriately decided for each application. Information on this reference distance d is referenced by the reference guide rail decision unit 22.

The reference angle is numerical information representing an angle θ which is used when a moving direction is decided. The angle θ is an angle in a plane of the two-dimensional area. The angle θ is an upper limit value of an angle formed by a direction of a slide trajectory when the slide operation is performed and the reference guide rail. Information on this reference angle θ is referenced by the moving direction determination unit 23.

Figure 6:
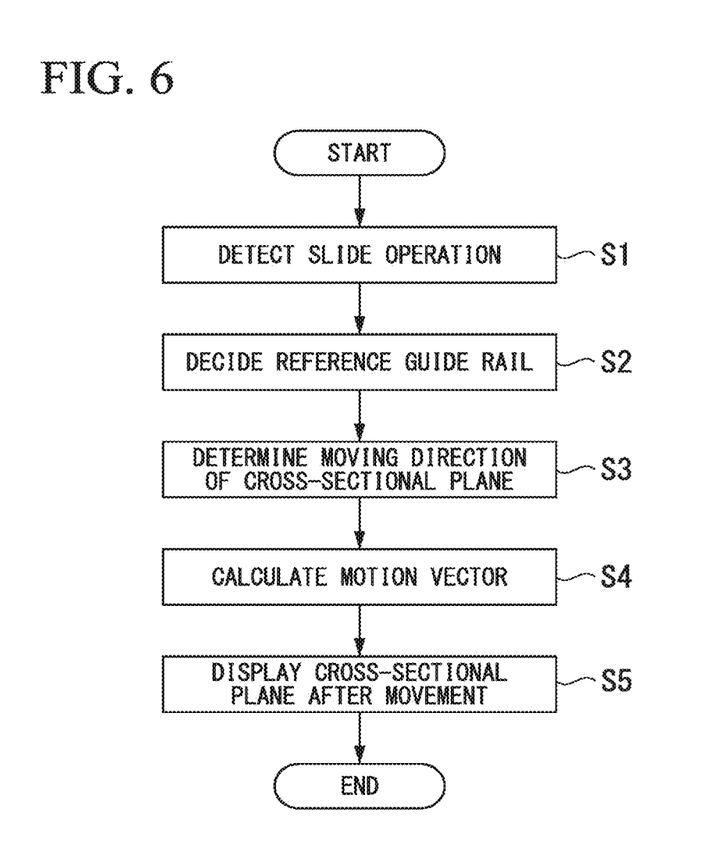
FIG. 6 is a flowchart which shows a process procedure for moving a cross-sectional plane using the image processing apparatus of the first embodiment.

FIG. 6 is a flowchart which shows a process procedure in which the image processing apparatus 1 moves and re-draws a cross-sectional plane in a three-dimensional space in accordance with a slide operation of a user. Hereinafter, an outline of the process of moving the cross-sectional plane will be described along this flowchart. First, in step S1, the operation acquisition unit 21 detects a slide operation. At this time, the operation acquisition unit 21 also acquires information on a position of a trajectory of the slide operation. Specifically, the operation acquisition unit 21 acquires coordinates (an x coordinate value and a y coordinate value) of a start point and an end point of the slide operation on a two-dimensional display screen (a two-dimensional area).

In the following step S2, the reference guide rail decision unit 22 decides a reference guide rail. Specifically, the reference guide rail decision unit 22 decides which one of one or more guide rails is set as a reference on the basis of the trajectory of the slide operation acquired by the operation acquisition unit 21. The reference guide rail may not be selected depending on the position of the trajectory of the slide operation. When the reference guide rail is not decided, a movement of the cross-sectional plane is not performed and the process in the present flowchart is canceled.

In the following step S3, the moving direction determination unit 23 determines a moving direction of the cross-sectional plane.

Specifically, the moving direction determination unit 23 obtains a guide vector which represents a moving direction of the cross-sectional plane on the basis of a direction of the trajectory of the slide operation acquired by the operation acquisition unit 21. The guide vector is a vector parallel to a direction of the reference guide rail decided above, and is a vector pointing in either a positive or negative direction. In the present embodiment, the reference guide rail is a line perpendicular to a cross-sectional plane set to be moved. That is, the guide vector is a vector representing any one of two directions perpendicular to a plane of the cross-sectional plane.

In the following step S4, the motion vector calculation unit 24 calculates a motion vector representing a movement of the cross-sectional plane. Specifically, the motion vector calculation unit 24 calculates the motion vector on the basis of the guide vector calculated as a vector representing movement in a two-dimensional area. The motion vector is a vector representing a moving direction of a moving plane and a magnitude of the movement in a three-dimensional section.

Details of a process performed by the motion vector calculation unit 24 will be described below.

Then, the motion vector calculation unit 24 moves the cross-sectional plane in the three-dimensional space using the calculated motion vector. Then, the motion vector calculation unit 24 passes information on a position and the like of the cross-sectional plane after the movement to the projection unit 41 so that the cross-sectional plane after the movement is projected onto the projection plane.

In the following step S5, the projection unit 41 displays the cross-sectional plane after the movement. Specifically, the projection unit 41 re-draws the projection plane with respect to at least the position of the cross-sectional plane before the movement and the position of the cross-sectional plane after the movement. Then, the projection unit 41 displays an image of the updated projection plane on a display device and the like.

If a process of the present step ends, the image processing apparatus 1 ends the entire process of this flowchart. Thereafter, if the operation acquisition unit 21 detects a slide operation of a user, the process is restarted from the step S1.

Next, further details of steps S1 to S5 described above will be described.

The operation acquisition unit 21 acquires information on an operation of a user. The operation acquired by the operation acquisition unit 21 in the present embodiment includes a touch operation and a slide operation. The touch operation is an operation of touching a certain position on a screen. The slide operation is an operation of sliding from a certain position on a screen to another position while touching the screen.

The operation acquisition unit 21 acquires coordinates (two-dimensional coordinates of x,y on the screen) of a touched point (a position) when the touch operation is performed. In addition, the operation acquisition unit 21 acquires coordinates of each of a start point and an end point of the slide operation when the slide operation is performed. For example, when the slide operation is continuously performed on an $n^{th}$ point, a $(n+1)^{th}$ point, and a $(n+2)^{th}$ point, the operation acquisition unit 21 acquires coordinates of each of these points. In addition, when neither the touch operation nor the slide operation is performed, the operation acquisition unit 21 acquires a state representing that there are none of these operations as information. Here, a "touching" operation in a case of using a touch panel is an operation of causing a finger, a pointing stick, or the like to touch a panel. In addition, the "touching" operation in a case of using a pen tab is an operation of causing a pen, a pointing stick, or the like to touch a pad. Moreover, the "touching" operation in a case of using a mouse is an operation of pressing a mouse button while a mouse cursor exists at a point. Moreover, the slide operation in a case of using a mouse is an operation of moving a mouse cursor while a mouse button is pressed.

The reference guide rail decision unit 22 decides which one of a plurality of guide rails to use as a movement reference when movement of a cross-sectional plane is started on the basis of the slide operation. The reference guide rail decision unit 22 acquires coordinates of a start point and an end point of the slide operation from the operation acquisition unit 21.

Specifically, the reference guide rail decision unit 22 performs the following process.

First, the reference guide rail decision unit 22 reads information on guide rails from the three-dimensional space information storage unit 13 and calculates a position at which these guide rails exist in a two-dimensional area.

At this time, the number of guide rails is one or more.

Next, the reference guide rail decision unit 22 calculates a distance between the start point of the slide operation (coordinates in the two-dimensional area given from the operation acquisition unit 21) and each of the guide rails in the two-dimensional area.

Next, the reference guide rail decision unit 22 selects a guide rail which has a distance from the start point less than or equal to a preset reference distance d and which is closest to the start point. That is, the reference guide rail decision unit 22 decides the selected guide rail as a reference guide rail. A distance from the start point of the slide operation to the guide rail will be described below with reference to FIG. 7.

Next, the reference guide rail decision unit 22 writes information (a guide rail ID) for identifying the decided reference guide rail in the two-dimensional area information storage unit 12. In addition, the reference guide rail decision unit 22 writes coordinates of a start point and an end point of the reference guide rail in the three-dimensional space in the three-dimensional space information storage unit 13.

When there is no reference guide rail in light of the above condition, the reference guide rail decision unit 22 does not write information on a reference guide rail. In addition, in this case, the image processing apparatus does not perform a subsequent process for moving the cross-sectional plane.

When the cross-sectional plane is moved on the basis of the slide operation, the moving direction determination unit 23 determines in which direction the movement is performed when the reference guide rail is set as a reference. The reference guide rail is handled as a one-dimensional line. Accordingly, the moving direction determination unit 23 determines whether a moving direction is positive or negative when a direction along the line is represented as a positive or negative value. The moving direction determination unit 23 acquires the coordinates of the start point and the end point of the slide operation from the reference guide rail decision unit 22.

Specifically, the moving direction determination unit 23 performs the following process.

First, the moving direction determination unit 23 calculates an angle formed by the reference guide rail (a straight line) and the trajectory of the slide operation on the displayed two-dimensional area. The trajectory of the slide operation may be regarded as a straight line.

Next, the moving direction determination unit 23 determines whether the angle calculated above (the angle formed by the reference guide rail and the trajectory of the slide operation) is less than or equal to a predetermined reference angle θ. If this angle is equal to or less than 0, the following process of moving the cross-sectional plane is continued. If this angle is larger than 0, the process of moving the cross-sectional plane is not performed.

Next, the moving direction determination unit 23 calculates a guide vector based on positional information on a point during the slide operation and information on the reference guide rail (the coordinates of the start point and the end point thereof). The guide vector represents a direction in which the cross-sectional plane is moved. Here, the guide vector is one of a positive direction and a negative direction of the reference guide rail. In addition, the guide vector is a vector having a direction of one of the positive and negative directions closer to a direction (a direction from the start point to the end point) of the trajectory of the slide operation.

A determination process of a moving direction by the moving direction determination unit 23 will be described below with reference to FIG. 8.

In addition, a process in which the moving direction determination unit 23 obtains a guide vector will be described below with reference to FIG. 9.

The motion vector calculation unit 24 obtains a motion vector for moving the cross-sectional plane on the basis of the trajectory of the slide operation. This motion vector is a vector representing movement in the three-dimensional space. The motion vector calculation unit 24 acquires the coordinates of the start point and the end point of the slide operation from the moving direction determination unit 23.

Specifically, the motion vector calculation unit 24 performs the following process.

First, the motion vector calculation unit 24 calculates an angle α on the basis of the information on the position of the projection plane in the three-dimensional space and the information on the reference guide rail (the coordinates of the start point and the end point). The angle α is an angle at which the projection plane and the reference guide rail intersect.

Next, the motion vector calculation unit 24 calculates a guide rail slope coefficient β based on a guide rail slope coefficient calculation function f( ) and the angle α calculated above. That is, the guide rail slope coefficient β is calculated by the following equation.

$$\beta = f(\alpha)$$

The guide rail slope coefficient calculation function f( ) is set to be appropriately determined according to an application. The function f( ) is a function having the following characteristics. That is, a domain of the function f(α) is 0 degrees≤α≤90 degrees. In addition, a value range of the function f(α) is 0<f(α)≤1. Moreover, the function f(α) is a function monotonically decreasing with respect to the variable α.

An example of a function f having these characteristics is the function shown below.

$$f(\alpha) = 0.9 \cos^2(\alpha) + 0.1$$

However, the function f is not limited to the function exemplified herein.

Information on a calculation equation for calculating the function f or information on a lookup table representing a relationship between input and output values of the function f may be stored in the three-dimensional space information storage unit 13 in advance.

In other words, the motion vector calculation unit 24 calculates a two-dimensional motion vector so that a ratio of an absolute value of the two-dimensional motion vector to an amount of movement of the slide operation monotonically decreases with respect to α based on α (0 degrees≤α≤90 degrees), which is a minimum angle at which the projection plane in the three-dimensional space and the reference guide rail intersect.

Next, the motion vector calculation unit 24 calculates the motion vector in the two-dimensional area using a guide vector $GV_n$ calculated by the moving direction determination unit 23 and the guide rail slope coefficient β calculated above. The motion vector in the two-dimensional area is referred to as a two-dimensional motion vector $MV_n$ for the sake of convenience. That is, the motion vector calculation unit 24 obtains the guide vector $GV_n$ according to the following equation.

$$MV_n = \beta \cdot GV_n$$

The amount of movement on the two-dimensional area can be corrected by multiplying the guide rail slope coefficient β. Advantages obtained by correcting the amount of movement on the two-dimensional area (the two-dimensional plane displayed on a display device and the like) are as follows. That is, if the cross-sectional plane moves a lot with a slight slide amount on the two-dimensional area when the angle α at which the projection plane and the reference guide rail intersect in the three-dimensional space is large (close to a right angle), a user has a problem in that it is difficult to move the cross-sectional plane as intended. By correcting the amount of movement to reduce such a problem, an advantage of facilitating control of the amount of movement of the cross-sectional plane can be obtained.

Next, the motion vector calculation unit 24 performs a process of converting the two-dimensional motion vector obtained above into a three-dimensional motion vector, which is a motion vector in the three-dimensional space. The motion vector calculation unit 24 refers to information on a position in the three-dimensional space of the reference guide rail to convert the two-dimensional motion vector into the three-dimensional motion vector.

Then, the motion vector calculation unit 24 performs back projection on a start point and an end point of the two-dimensional motion vector $MV_n$ on the reference guide rail on the projection plane from the position of a viewpoint (the xyz coordinates in the three-dimensional section). That is, the motion vector calculation unit 24 sets an intersection point between the reference guide rail and a straight line connecting the viewpoint and the start point of the two-dimensional motion vector $MV_n$ in the three-dimensional space as a start point of the three-dimensional motion vector. In addition, the motion vector calculation unit 24 sets an intersection point between the reference guide rail and a straight line connecting the viewpoint and the end point of the two-dimensional motion vector $MV_n$ in the three-dimensional space as an end point of the three-dimensional motion vector. As described above, the motion vector calculation unit 24 obtains the start point and the end point of the three-dimensional motion vector. That is, a process of converting (reversely projecting) from the two-dimensional motion vector into the three-dimensional motion vector is performed.

A procedure for acquiring positional information in a three-dimensional space of a reference guide rail herein is as follows. That is, the motion vector calculation unit 24 can acquire a guide rail ID of the reference guide rail by referring to the two-dimensional area information storage unit 12. Then, the motion vector calculation unit 24 refers to the three-dimensional space information storage unit 13 using the acquired guide rail ID. The motion vector calculation unit 24 reads positional information (coordinates of a start point and an end point) of a guide rail having this ID in the three-dimensional space from the three-dimensional space information storage unit 13.

The motion vector calculation unit 24 can convert a two-dimensional motion vector in a two-dimensional area into a three-dimensional motion vector in a three-dimensional space not only according to the procedure exemplified above.

Even without actually obtaining a start point and an end point of the three-dimensional motion vector, an amount of movement of the cross-sectional plane in the three-dimensional space is sufficiently calculated. As a premise, a moving direction of a cross-sectional plane is restricted to a direction of a guide rail (a direction perpendicular to the cross-sectional plane).

Then, the motion vector calculation unit 24 actually moves the cross-sectional plane on the basis of the amount of movement obtained as a result of the calculation.

Figure 7:
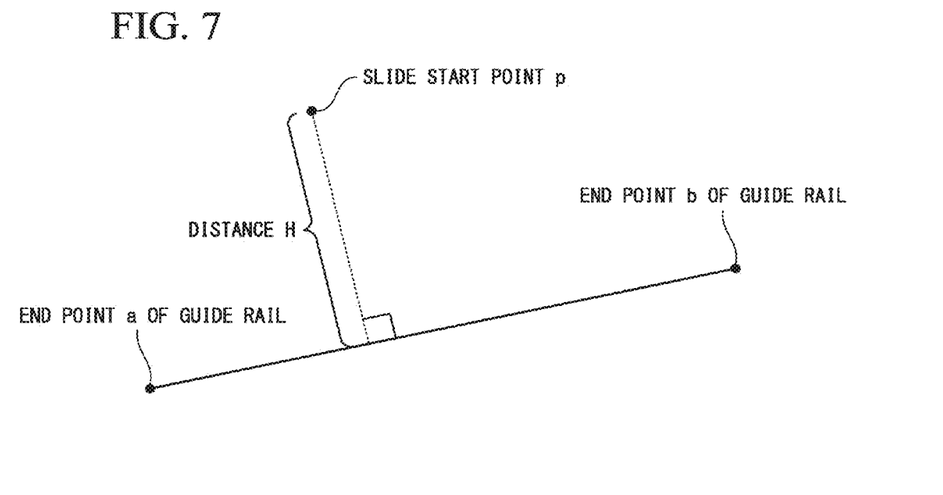
FIG. 7 is a schematic diagram (a plan view of a two-dimensional area) for describing a process in which a reference guide rail decision unit of the first embodiment decides a reference guide rail.

FIG. 7 is a schematic diagram which shows a distance between a start point of a slide operation and a guide rail when the reference guide rail decision unit 22 performs a process of deciding a reference guide rail. In FIG. 7, the image processing apparatus 1 indicates a display plane displayed on a display device and the like. In FIG. 7, a point p is a start point of a slide operation of a user. In addition, a point a is a start point of a certain guide rail. Moreover, a point b is an end point of the guide rail. The reference guide rail decision unit 22 calculates a distance from the start point of the slide operation to each guide rail to decide a reference guide rail. The reference guide rail decision unit 22 calculates a distance H from the start point p of the slide operation to a guide rail using the following equation.

$$H = \sin(\gamma) \cdot |V_{ap}|$$

Here, $V_{ap}$ is a vector from the point a to the point p. In addition, γ is an angle formed by a straight line ap and a straight line ab. In addition, sin is a sine function. γ is obtained by the following equation.

$$\gamma = a\cos\{(V_{ab} \cdot V_{ap})/(|V_{ab}| \cdot |V_{ap}|)\}$$

Here, $V_{ap}$ is a vector from the point a to the point b. In addition, $V_{ab} \cdot V_{ap}$ represents an inner product of a vector $V_{ab}$ and a vector $V_{ap}$. Moreover, a cos is an arc cosine function.

A procedure other than calculation by the above equations may also be used as a procedure for calculating the distance H.

Figure 8:
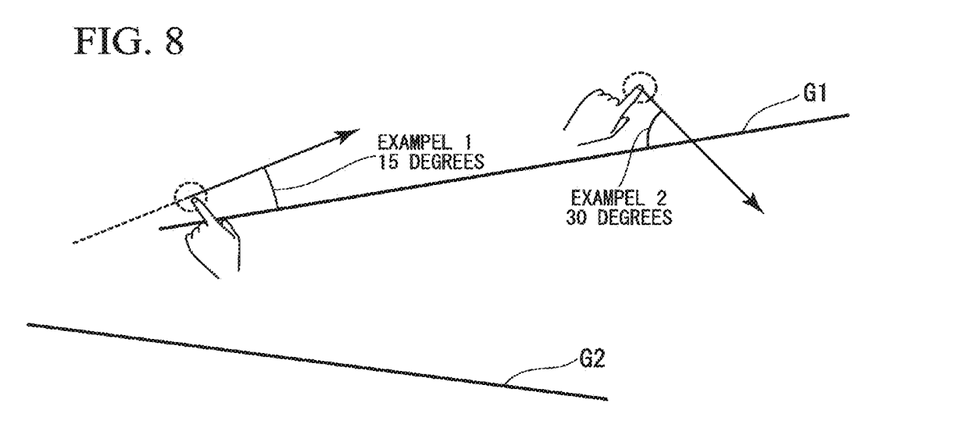
FIG. 8 is a schematic diagram which describes a process in which a moving direction determination unit of the first embodiment determines a moving direction of a cross-sectional plane.

FIG. 8 is a schematic diagram which shows an angle formed by a direction represented by a slide trajectory and a guide rail when a process of deciding a moving direction of a cross-sectional plane is performed by the moving direction determination unit 23. In FIG. 8, each of G1 and G2 is a guide rail. Then, in a situation shown in FIG. 8, the guide rail G1 has already been decided to be a reference guide rail. FIG. 8 shows an example of two types of slide operation. Here, the moving direction determination unit 23 calculates an angle formed by a trajectory of a slide operation and the reference guide rail.

Here, a method of calculating the angle is as follows. Two-dimensional coordinates (xy coordinates) of a straight line of the trajectory of the slide operation and a straight line of the reference guide rail in the two-dimensional area are represented by the following equations, respectively.

$y=mx+n$ ... the straight line of the trajectory of the slide operation $y=sx+t$ ... the straight line of the reference guide rail At this time, both of the straight lines are orthogonal to each other when $ms=-1$. In addition, both of the straight lines are also orthogonal to each other when the reference guide rail is parallel to a y axis with $m=0$. Moreover, both of the straight lines are also orthogonal to each other when the straight line of the trajectory of the slide operation is parallel to the y axis with $s=0$. Except the cases in which both of these straight lines are orthogonal to each other, the angle α on an acute angle side formed by both of the straight lines is represented by the following equation.

$A=a\tan|(m-s)/(1+ms)|$

Here, a tan represents an arctangent function.

In a slide operation of Example 1 in FIG. 8, an angle formed by a trajectory of the slide operation (indicated by an arrow line) and the guide rail G1, which is the reference guide rail, is 15 degrees. In addition, in a slide operation of Example 2, an angle formed by a trajectory of the slide operation and the guide rail G1, which is the reference guide rail, is 30 degrees. Here, on the assumption that the reference angle θ is 20 degrees, the angle (15 degrees) formed by the trajectory of the slide operation and the reference guide rail in Example 1 is less than or equal to the reference angle.

However, in the case of Example 2, the angle (30 degrees) formed by the trajectory of the slide operation and the reference guide rail exceeds the reference angle. Therefore, when the slide operation of Example 1 is performed, the moving direction determination unit 23 determines a guide vector and the process of moving the cross-sectional plane is continued. On the other hand, when the slide operation of Example 2 is performed, a direction of the slide operation is larger than the reference angle, and the moving direction determination unit 23 does not determine a guide vector. In this case, the process of moving the cross-sectional plane is discontinued.

In other words, when the angle formed by the direction of the slide operation and the reference guide rail is larger than a preset threshold value, the motion vector calculation unit 24 does not perform the process of moving the cross-sectional plane.

Figure 9:
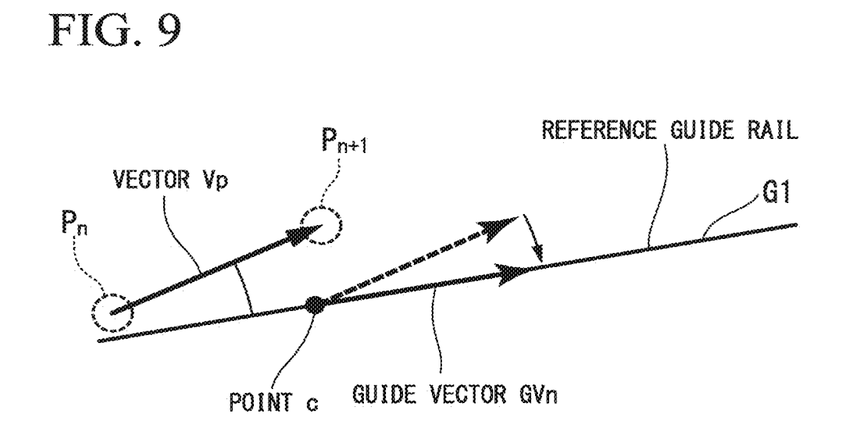
FIG. 9 is a schematic diagram which describes a process in which the moving direction determination unit of the first embodiment obtains a guide vector for moving a cross-sectional plane.

FIG. 9 is a schematic diagram which describes a process in which the moving direction determination unit 23 obtains a guide vector for moving a cross-sectional plane. In FIG. 9, G1 is a reference guide rail. In addition, a vector $V_p$ is a vector from a start point $P_n$ to an end point $P_{n+1}$ of a slide operation. Moreover, a point c is an arbitrary point on the reference guide rail and is an intersection point between the reference guide rail and the cross-sectional plane before movement. Then, a vector $GV_n$ is the obtained guide vector. The moving direction determination unit 23 obtains the guide vector $GV_n$ with a start point of the point c. At this time, the moving direction determination unit 23 obtains the guide vector $GV_n$ so that a length (an absolute value) of the vector $V_p$ is equal to a length (an absolute value) of the guide vector $GV_n$. That is, the following equation is satisfied.

$|V_p|=|GV_n|$

In other words, the guide vector $GV_n$ is a vector obtained by rotating (the amount of rotation is the angle α) the vector $V_p$ so that the vector $V_p$ is equal to the direction of the reference guide rail.

As mentioned above, the number of guide rails in the present embodiment is an arbitrary number of one or more. In each of FIGS. 2 and 3, a case in which the number of guide rails is two is exemplified, but the number of guide rails is not limited to two.

In addition, a frame line of the quadrangular cross-sectional plane is displayed in each of FIGS. 2 and 3. However, as a modified example of the present embodiment, the frame line of the cross-sectional plane may not be displayed.

In addition, in the present embodiment, a guide rail is orthogonal to a cross-sectional plane to be moved in a three-dimensional space. However, the guide rail and the cross-sectional plane are not necessarily orthogonal to each other, and the guide rail and the cross-sectional plane may intersect at a preset predetermined angle. Even when the guide rail and the cross-sectional plane are not orthogonal to each other, a moving direction of the cross-sectional plane is restricted to one of a positive direction and a negative direction of the guide rail. Moreover, when the guide rail and the cross-sectional plane intersect at the preset predetermined angle, it is possible to move the cross-sectional plane in a process procedure described in the present embodiment. In a display of a three-dimensional space in many applications, there are many cases in which a guide rail and a cross-sectional plane are orthogonal to each other, but it is possible to apply the present embodiment even in a special situation in which the guide rail and the cross-sectional plane are not orthogonal to each other.

According to the present embodiment, since a direction of movement of a cross-sectional plane in a three-dimensional space is decided on the basis of a slide operation on a user's screen to correspond to a moving direction of the slide operation on the screen, it is possible to provide an interface through which the user can directly operate a display area of a projection plane and move the cross-sectional plane.

In addition, in this user interface, the user can move the cross-sectional plane in a direction in accord with the direction of the slide operation on the screen. That is, the image processing apparatus 1 can provide a user interface which facilitates intuitive understanding.

Moreover, according to the present embodiment, particularly in the case of perspective projection, it is possible to present the moving direction of the cross-sectional plane or a positional relationship before and after movement to a user in an easy-to-understand manner since the guide rail is displayed.

In addition, according to the present embodiment, a user does not need to point at a specific point since a guide rail in the vicinity of a slide operation of the user is obtained and a movement of the cross-sectional plane is performed.

Moreover, according to the present embodiment, a user can control the moving direction and the amount of movement of the cross-sectional plane on the basis of the amount of the slide operation (a length of the trajectory of the slide operation) and the like since the amount of movement of the cross-sectional plane is decided on the basis of the amount of the slide operation.

Second Embodiment

Next, a second embodiment will be described. A description for the items described in the previous embodiment may be omitted herein. Here, specific items of the present embodiment will be described.

A block diagram which shows a functional configuration of the present embodiment is as shown in FIG. 1.

A characteristic of the present embodiment is that the image processing apparatus 1 does not display a guide rail. In other words, the projection unit 41 of the present embodiment projects and draws objects other than a guide rail onto the projection plane, but does not draw the guide rail. Even when the guide rail is not displayed, an operation of the image processing apparatus 1 after a slide operation by a user is detected is the same as that described in the first embodiment. That is, the reference guide rail decision unit 22 selects a reference guide rail on the basis of a position of a start point of the slide operation. In addition, processing by the moving direction determination unit 23 and the motion vector calculation unit 24 are the same as in the first embodiment.

According to the present embodiment, since the guide rail is not displayed, the image processing apparatus performs a simple display. When there are many objects in a three-dimensional space to be displayed, a display without the guide rail may provide a user with improved visibility.

Third Embodiment

Next, a third embodiment will be described. A description for the items described in the previous embodiments may be omitted herein. Here, specific items of the present embodiment will be described.

A block diagram which shows a functional configuration of the present embodiment is as shown in FIG. 1.

A characteristic of the present embodiment is that a guide rail is not preset before a slide operation is performed, and the guide rail is set for the first time when the slide operation is performed.

In the first embodiment, the guide rail information generation unit 31 generates guide rail information on the basis of guide rail setting information stored by the three-dimensional space information storage unit 13. In addition, as a result, the image processing apparatus 1 displays a predetermined number of guide rails (the number set depending on a setting). In addition, the reference guide rail decision unit 22 decides a guide rail closest to (less than or equal to the reference distance d) a start point of the detected slide operation as a reference guide rail.

In contrast, in the present embodiment, the guide rail information generation unit 31 does not generate guide rail information in advance. Therefore, the image processing apparatus 1 does not display a guide rail at least until a slide operation for moving a cross-sectional plane is performed.

In the present embodiment, when the operation acquisition unit 21 detects information on a slide operation, a position of a guide rail is calculated on the basis of a position of a start point of the slide operation (coordinates in a two-dimensional area). Specifically, the guide rail information generation unit 31 calculates the guide rail in a three-dimensional space corresponding to the start point on the basis of the position of the start point of the detected slide operation. Then, the reference guide rail decision unit 22 decides the guide rail obtained by the guide rail information generation unit 31 as a reference guide rail.

Here, a method of deciding a guide rail on the basis of a start point of a slide operation will be described in each of cases of (1) parallel projection and (2) perspective projection. A position of a cross-sectional plane at this time can be read from the three-dimensional space information storage unit 13.

(1) In the case of parallel projection: There are a large number (an infinite number) of straight lines L3 perpendicular to a cross-sectional plane in a three-dimensional space. The guide rail information generation unit 31 obtains a straight line L2 on a two-dimensional area obtained as a result of projecting any one of these straight lines L3 onto a projection plane. Then, the reference guide rail decision unit 22 decides a straight line (there is one), which is a straight line on the two-dimensional area parallel to the obtained L2 and passes through a start point of a slide operation, as a reference guide rail. In the case of parallel projection, since two straight lines parallel in the three-dimensional space are still parallel when the lines are projected onto the two-dimensional area, it is possible to obtain a reference guide rail in this method.

(2) In the case of perspective projection: The guide rail information generation unit 31 appropriately selects two different straight lines L31 and L32 perpendicular to a cross-sectional plane in a three-dimensional space. The straight lines L31 and L32 are preferably selected such that they are separated from each other by a predetermined distance or more. Then, the guide rail information generation unit 31 obtains straight lines L21 and L22 on a two-dimensional area, which are obtained as a result of projecting the straight lines L31 and L32 onto a projection plane. Then, the guide rail information generation unit 31 obtains an intersection point C between the straight lines L21 and L22 on the two-dimensional area. This intersection point C is a vanishing point of perspective projection on the two-dimensional area. Then, the reference guide rail decision unit 22 decides a straight line which passes through the point C and a start point of a slide operation as a reference guide rail.

In other words, in the present embodiment, the reference guide rail decision unit 22 obtains a guide rail which passes through a point in a three-dimensional space corresponding to a position of a start point of a slide operation on a projection plane and which is orthogonal to the cross-sectional plane in the three-dimensional space at a time when the slide operation starts. Then, the reference guide rail decision unit 22 decides the guide rail as a reference guide rail.

After the reference guide rail is decided, a process until the cross-sectional plane is moved is the same as in the first embodiment.

In the present embodiment, a timing for starting a display of a reference guide rail is set to be when a user starts a slide operation. Alternatively, the user may first start the display of the reference guide rail at a timing when the user long presses a start point of the slide operation, and the user may continuously perform the slide operation after the display of the reference guide rail. In addition, the cross-sectional plane may also be moved while the reference guide rail is not displayed.

According to the present embodiment, a position of the guide rail is not determined in advance and the position of the guide rail is determined on the basis of the position of the start point of the slide operation. As a result, there is no situation in which the reference guide rail is not decided because a start position of a slide operation is too far from the guide rail determined in advance. That is, the reference guide rail is always decided by a slide operation from a place desired by a user.

According to at least one of the embodiments described above, it is possible to provide a user interface which moves a cross-sectional plane in a manner closely matching a user's intuition by including the motion vector calculation unit which decides a direction of a two-dimensional motion vector in a two-dimensional area on the basis of a slide operation and decides a three-dimensional motion vector in a form corresponding to the two-dimensional motion vector.

At least a part of the functions of the image processing apparatus according to one of the embodiments described above may be realized by a computer. In this case, the function may be realized by recording a program for realizing the function on a computer readable recording medium and causing a computer system to read and execute the program recorded on the recording medium. "Computer system" herein includes hardware such as an OS and peripheral devices. In addition, "computer readable recording medium" refers to a portable medium such as a flexible disk, a magneto-optical disk, a ROM, and a CD-ROM, and a storage device such as a hard disk embedded in the computer system. Further, "computer readable recording medium" may include a medium which dynamically holds a program for a short period of time like a communication line when the program is transmitted through a network such as the Internet or a communication line such as a telephone line, and a medium which holds the program for a certain period of time like a volatile memory in the computer system, which is a server or a client in this case. Moreover, the program may be for realizing a part of the functions described above, and may also be for realizing the functions described above in combination with a program recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a three-dimensional space information storage unit configured to store a position of a cross-sectional plane in a three-dimensional space;
   a guide rail information generation unit configured to generate guide rail information, which is information on one or more guide rails, which are straight lines, and to write the information in the three-dimensional space information storage unit on the basis of preset setting information and the information on the position of the cross-sectional plane;
   a projection unit configured to project and draw the cross-sectional plane in the three-dimensional space onto a projection plane on the basis of information on the position of the cross-sectional plane stored in the three-dimensional space information storage unit, and to project a guide rail onto the projection plane on the basis of the guide rail information generated by the guide rail information generation unit;
   an operation acquisition unit configured to detect a slide operation to cause a point on a screen on which the projection plane is drawn to slide, and to acquire information on a position on the screen at which the slide operation is performed;
   a reference guide rail decision unit configured to refer to the three-dimensional space information storage unit and select and decide a reference guide rail among guide rails generated by the guide rail information generation unit on the basis of the information on the position of the slide operation acquired by the operation acquisition unit, wherein the decided reference guide rail exists near the position of the slide operation when a guide rail intersecting the cross-sectional plane in the three-dimensional space at a predetermined angle is projected onto the projection plane; and
   a motion vector calculation unit configured to calculate a two-dimensional motion vector, which represents a movement on the screen and is parallel to the reference guide rail, on the basis of a direction of the slide operation and an amount of movement when the slide operation is performed, to calculate a three-dimensional motion vector representing a direction of movement and an amount of movement in the three-dimensional space corresponding to a two-dimensional motion vector existing on the projection plane, and to change the position of the cross-sectional plane in the three-dimensional space stored by the three-dimensional space information storage unit in accordance with the calculated three-dimensional motion vector.

2. The image processing apparatus according to claim 1, wherein the reference guide rail decision unit obtains a guide rail passing through a point in the three-dimensional space corresponding to a position of a start point of the slide operation on the projection plane and intersecting the cross-sectional plane in the three-dimensional space at the predetermined angle at a time when the slide operation starts, and decides the guide rail as the reference guide rail.

3. The image processing apparatus according to claim 1, wherein the projection unit projects and draws a guide rail existing in the three-dimensional space onto the projection plane.

4. The image processing apparatus according to claim 1, wherein the motion vector calculation unit calculates the two-dimensional motion vector on the basis of a ($0° \leq \alpha \leq 90°$), which is a minimum angle at which the projection plane in the three-dimensional space and the reference guide rail intersect, so that a ratio of the two-dimensional motion vector to an amount of movement of the slide operation monotonically decreases with respect to a.

5. The image processing apparatus according to claim 1, wherein the motion vector calculation unit does not perform a process of moving the cross-sectional plane when an angle formed by a direction of the slide operation and the reference guide rail is larger than a predetermined threshold value.

6. An image processing method comprising:

storing, in a three-dimensional space information storage unit, a position of a cross-sectional plane in a three-dimensional space;

generating guide rail information, which is information on one or more guide rails, which are straight lines, on the basis of preset setting information and the information on the position of the cross-sectional plane;

projecting and drawing the cross-sectional plane in the three-dimensional space onto a projection plane on the basis of information on the position of the cross-sectional plane stored in the three-dimensional space information storage unit;

projecting the one or more guide rails onto the projection plane on the basis of the generated guide rail information;

detecting a slide operation to cause a point to slide on a screen on which the projection plane is drawn, and acquiring information on a position on the screen at which the slide operation is performed;

deciding a reference guide rail among the generated guide rails existing near a position of the slide operation when a guide rail intersecting the cross-sectional plane in the three-dimensional space at a predetermined angle is projected onto the projection plane on the basis of the information on the position of the slide operation acquired, wherein the decided reference guide line exists near a position of the slide operation when a guide rail intersecting the cross-sectional plane in the three-dimensional space at a predetermined angle is projected onto the projection plane;

calculating a two-dimensional motion vector, which represents a movement on the screen and is parallel to the reference guide rail, on the basis of a direction of the slide operation and an amount of movement when the slide operation is performed;

calculating a three-dimensional motion vector representing a direction of movement and an amount of movement in the three-dimensional space corresponding to a two-dimensional motion vector existing on the projection plane; and changing the position of the cross-sectional plane in the three-dimensional space stored by the three-dimensional space information storage unit in accordance with the calculated three-dimensional motion vector.

7. A non-transitory computer readable storage medium that stores a computer program, which causes, when executed by a computer, the computer to perform an image processing method comprising:

storing, in a three-dimensional space information storage unit, a position of a cross-sectional plane in a three-dimensional space;

generating guide rail information, which is information on one or more guide rails, which are straight lines, on the basis of preset setting information and the information on the position of the cross-sectional plane;

projecting and drawing the cross-sectional plane in the three-dimensional space onto a projection plane on the basis of information on the position of the cross-sectional plane stored in the three-dimensional space information storage unit;

projecting the one or more guide rails onto the projection plane on the basis of the generated guide rail information;

detecting a slide operation to cause a point to slide on a screen on which the projection plane is drawn, and acquiring information on a position on the screen at which the slide operation is performed;

deciding a reference guide rail among the generated guide rails existing near a position of the slide operation when a guide rail intersecting the cross-sectional plane in the three-dimensional space at a predetermined angle is projected onto the projection plane on the basis of the information on the position of the slide operation acquired, wherein the decided reference guide line is exists near a position of the slide operation when a guide rail intersecting the cross-sectional plane in the three-dimensional space at a predetermined angle is projected onto the projection plane;

calculating a two-dimensional motion vector, which represents a movement on the screen and is parallel to the reference guide rail, on the basis of a direction of the slide operation and an amount of movement when the slide operation is performed;

calculating a three-dimensional motion vector representing a direction of movement and an amount of movement in the three-dimensional space corresponding to a two-dimensional motion vector existing on the projection plane; and changing the position of the cross-sectional plane in the three-dimensional space stored by the three-dimensional space information storage unit in accordance with the calculated three-dimensional motion vector.

* * * * *